(12) United States Patent
Tsao

(10) Patent No.: US 10,798,234 B1
(45) Date of Patent: Oct. 6, 2020

(54) STATIONERY STORAGE CAPABLE OF SOUND AMPLIFICATION OF MOBILE PHONE

(71) Applicant: E-PACKAGE CREATION & SOLUTION MANUFACTURING CORP., Taipei (TW)

(72) Inventor: Chung-Piao Tsao, Taipei (TW)

(73) Assignee: E-PACKAGE CREATION & SOLUTION MANUFACTURING CORP., Taipei (TW)

( * ) Notice: Subject to any disclaimer, the term of this patent is extended or adjusted under 35 U.S.C. 154(b) by 0 days.

(21) Appl. No.: 16/655,241

(22) Filed: Oct. 17, 2019

(51) Int. Cl.
- H04M 1/00 (2006.01)
- H04M 1/04 (2006.01)
- H04M 1/03 (2006.01)

(52) U.S. Cl.
CPC ............. H04M 1/04 (2013.01); H04M 1/035 (2013.01)

(58) Field of Classification Search
CPC ................................ H04M 1/04; H04M 1/035
USPC ........................................................ 455/575.1
See application file for complete search history.

(56) References Cited

U.S. PATENT DOCUMENTS

| | | | | |
|---|---|---|---|---|
| 5,456,497 A | * | 10/1995 | Ross, Jr. ................ | B42D 3/18 116/234 |
| D497,184 S | * | 10/2004 | Bain .............................. | D19/75 |
| D585,495 S | * | 1/2009 | Yoshikawa .................... | D19/78 |
| 2002/0094079 A1 | * | 7/2002 | Edwards ................. | H04M 1/04 379/454 |
| 2009/0032479 A1 | * | 2/2009 | Robinson ............. | B43M 99/006 211/11 |
| 2013/0032554 A1 | * | 2/2013 | Namngani ........... | A47B 17/033 211/69.5 |
| 2014/0370944 A1 | * | 12/2014 | Green .................... | A45C 13/34 455/575.1 |
| 2015/0011269 A1 | * | 1/2015 | Liu ...................... | H04M 1/0202 455/575.1 |
| 2015/0288405 A1 | * | 10/2015 | Gygax .................... | H04M 1/04 455/575.1 |
| 2016/0035336 A1 | * | 2/2016 | Chang ..................... | H04M 1/62 455/575.1 |
| 2016/0036477 A1 | * | 2/2016 | Teshima ............... | H04B 1/3827 455/575.1 |
| 2016/0173669 A1 | * | 6/2016 | Smiley ................. | H04B 1/3888 455/575.1 |
| 2016/0173670 A1 | * | 6/2016 | Langhein ................ | H04M 1/04 455/575.1 |

(Continued)

FOREIGN PATENT DOCUMENTS

CN 208855317 U * 5/2019

*Primary Examiner* — Ankur Jain
*Assistant Examiner* — Max Mathew
(74) *Attorney, Agent, or Firm* — Leong C. Lei

(57) ABSTRACT

A stationery storage capable of sound amplification of a mobile phone, including: a container, having an accommodation space in communication with the outside, one side of the container having an inclined surface, a bottom of the inclined surface extended outward with a groove, one side of the groove protruded with a plurality of spaced cover bodies, and a passage in communication with the groove formed between each cover body and the groove, where the accommodation space provides the accommodation of articles, the groove provides the placement of a smart mobile device, and the sound amplification of the smart phone is carried out through each passage.

2 Claims, 4 Drawing Sheets

(56) References Cited

U.S. PATENT DOCUMENTS

2018/0317649 A1* 11/2018 Kasravi .................. B42F 7/145

* cited by examiner

STATIONERY STORAGE CAPABLE OF SOUND AMPLIFICATION OF MOBILE PHONE

(a) TECHNICAL FIELD OF THE INVENTION

The present invention relates to a desktop storage device, and more particularly to a stationery storage capable of sound amplification of a mobile phone, providing the functions of both collecting stationery and placing a smart mobile device, and having a sound amplification structure to increase the sound volume of the mobile device.

(b) DESCRIPTION OF THE PRIOR ART

Pen cases are common stationery; they are always placed on desks and used to collect stationery such as pens, small knifes, scissors, rulers, erasers and staplers so as to allow users to conveniently use them any time.

For many office workers who need to use computerized paperwork, the most commonly used tools are computers, and secondly, diverse stationery. Therefore, a user needs to consider how to use a limited desk space to place stationery when storing these stationeries.

In addition, because computers, mobile phones and tablets are used very popularly and become indispensable 3C products for modern people, many business models often rely on the transmission of communication software such that mobile phones and tablets are used very often relatively. To use mobile phones or tablets conveniently, many mobile phone holder related products are available in the market; they are always structures externally added to mobile phones or tables and prone to incline mobile phones or tablets. However, the desktop space of a desk is limited such that how to place a mobile phone or tablet in a compact and space-saving way is very important.

SUMMARY OF THE INVENTION

To overcome the above defects, the present invention is proposed.

The present invention proposes a stationery storage capable of sound amplification of a mobile phone, including: a container, having an accommodation space in communication with the outside, one side of the container having an inclined surface, a bottom of the inclined surface extended outward with a groove, one side of the groove protruded with a plurality of spaced cover bodies, and a passage in communication with the groove formed between each cover body and the groove, where the accommodation space provides the accommodation of articles, the groove provides the placement of a smart mobile device, and the sound amplification of the smart phone is carried out through each passage.

DETAILED DESCRIPTION OF THE PREFERRED EMBODIMENTS

Figure 1:
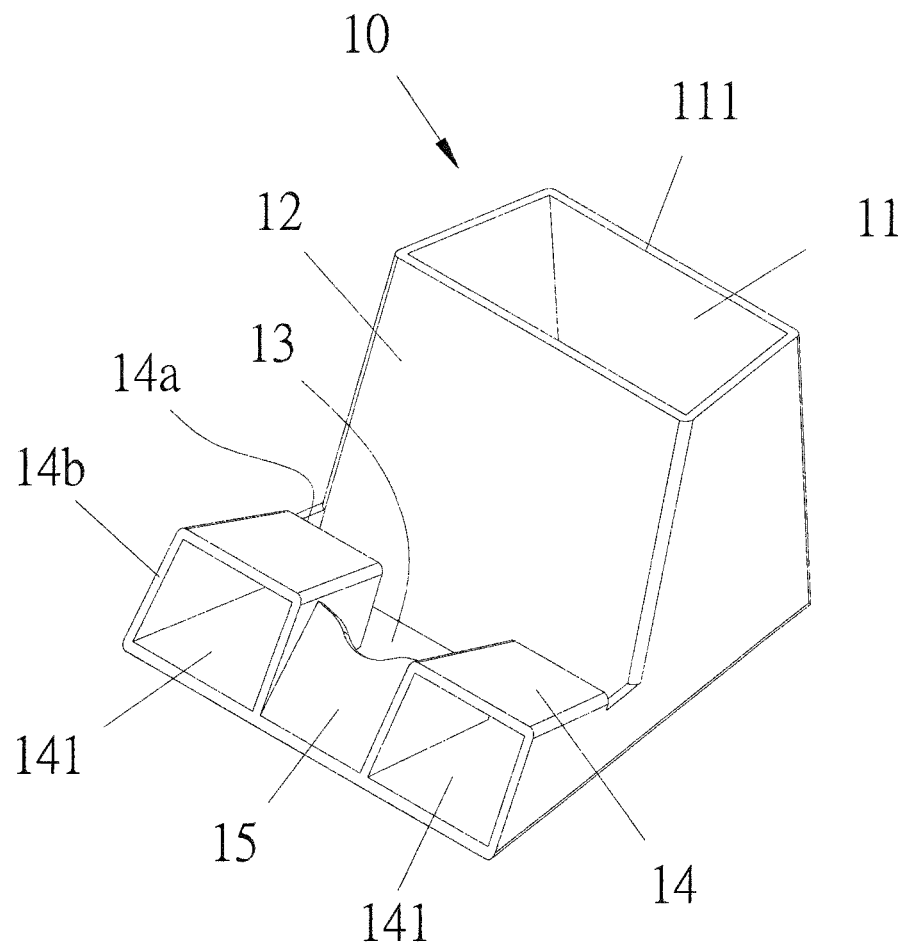
FIG. 1 is a perspective view of the present invention.

Referring to FIG. 1, a stationery storage capable of sound amplification of a mobile phone includes a container 10 having an accommodation space 11 in communication with the outside, where an end surface 111 of the container 10 is a trapezoidal surface.

One side of the container 10 has an inclined surface 12, the bottom of which is extended outward with a groove 13, and one side of the groove 13 is protruded with a plurality of spaced cover bodies 14. Furthermore, a plate body 15 is configured between each two adjacent cover bodies 14.

A passage 141 in communication with the groove 13 is formed between each cover body 14 and the groove 13.

One end of each cover body 14 facing the inclined surface 12 is a first end 14a and another end thereof is a second end 14b; the first end 14a of the cover body 14 is lower than the second end 14b thereof, causing the top surface of the cover body 14 to be formed into an inclined surface. Furthermore, the length of the top surface of the cover body 14 is smaller than the one of the bottom of the groove 13, causing the second end 14b of the cover body 14 to be inclined, where the plate body 15 is configured to be inclined, and the inclined angle of the plate body 15 is larger than each first end 14a.

Figure 2:
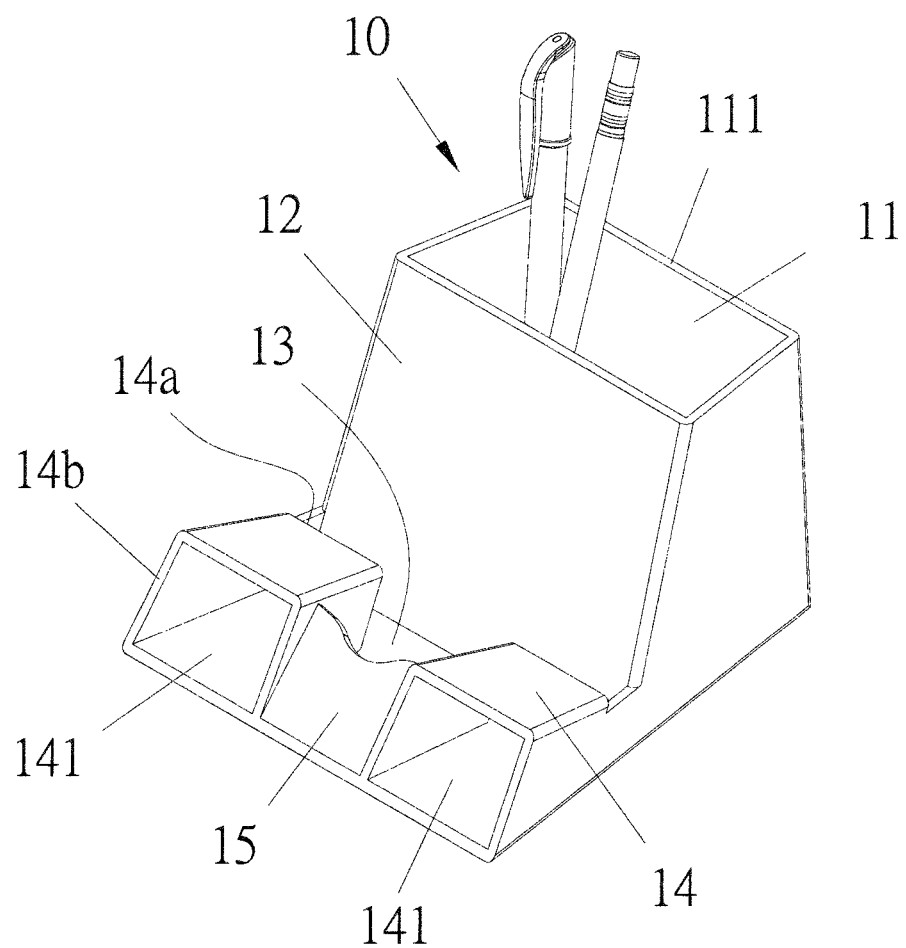
FIG. 2 is a perspective view of the present invention, showing a state in which articles are collected.
Figure 3:
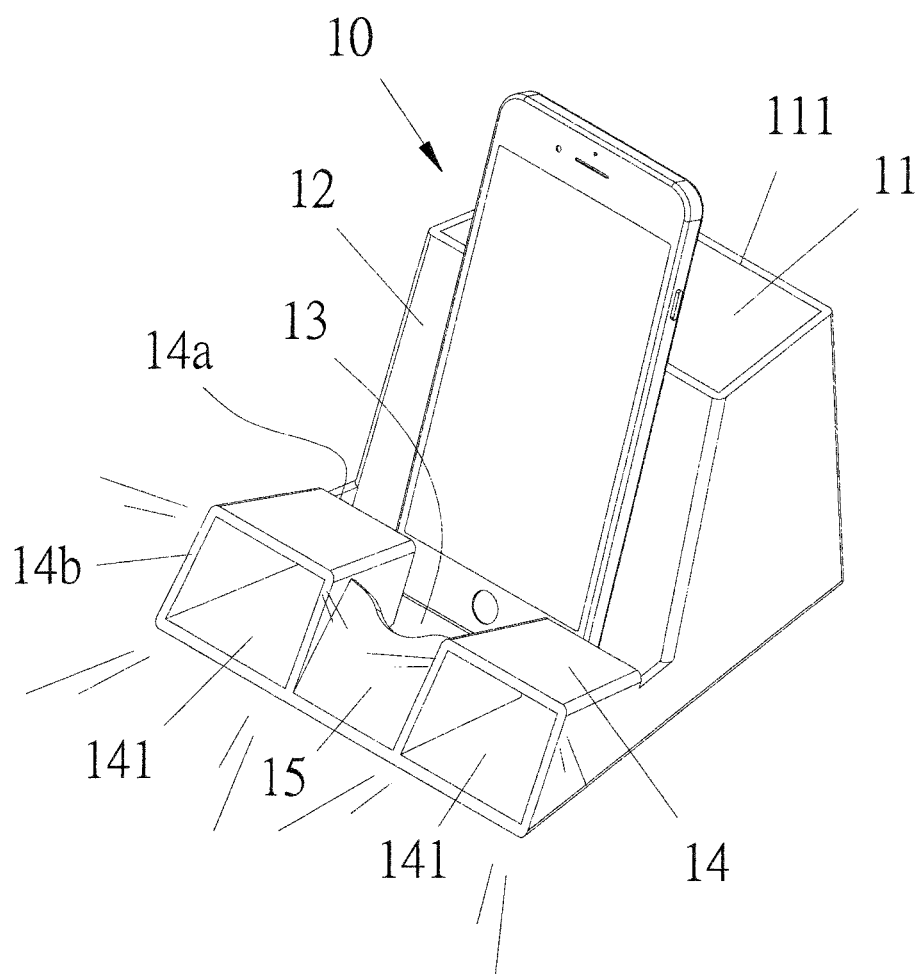
FIG. 3 is a perspective view of the present invention, showing a state, in which a mobile device is erectly placed.
Figure 4:
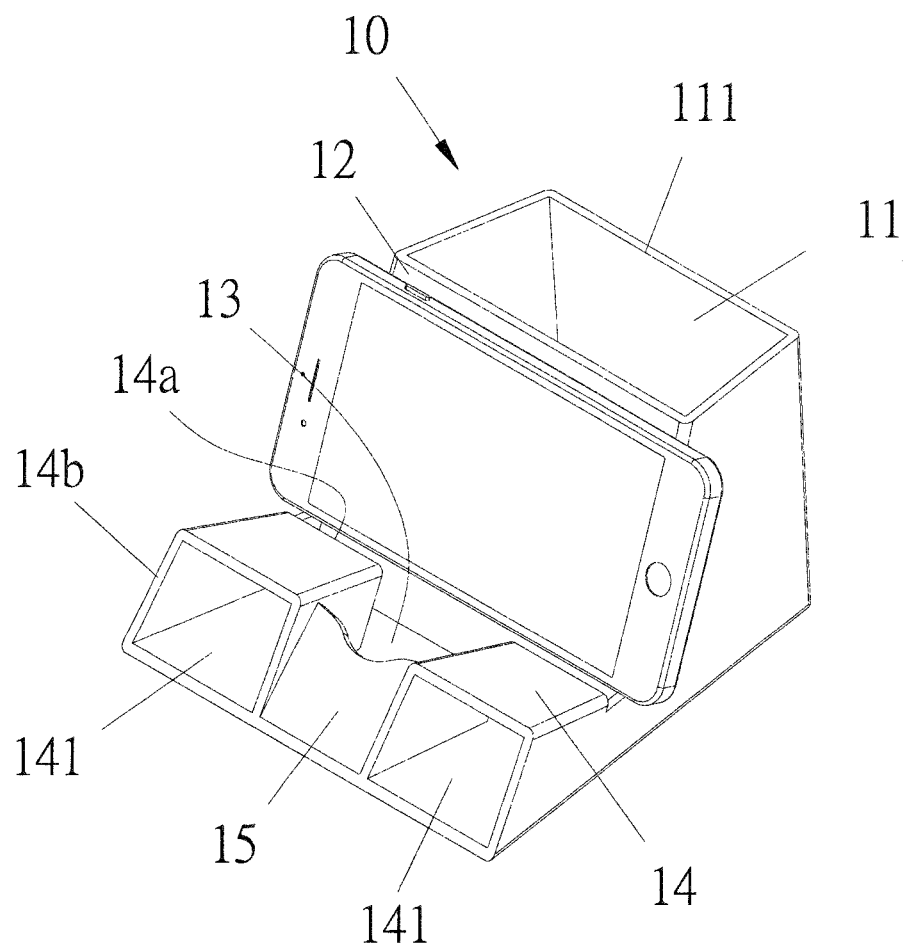
FIG. 4 is a perspective view of the present invention, showing a state, in which a mobile device is horizontally placed.

Referring to FIGS. 2 to 4, the container 10 provides the accommodation of articles such as pens shown in the figures when the stationery storage of the present invention is put into use, but the present invention is not so limited. The groove 13 allows a smart mobile device such as a mobile phone or tablet to be placed therein; the sound of the smart device will diffuse out from each passage 141 to achieve the effect of sound amplification.

I claim:

1. A stationery storage for sound amplification of a mobile phone, comprising:
    a container, having an accommodation space in communication with the outside, one side of said container having an inclined surface, a bottom of said inclined surface extended outward with a groove, one side of said groove protruded with a plurality of spaced cover bodies, and a passage in communication with said groove formed between each said cover body and said groove;
    wherein one end of each said cover body facing said inclined surface is a first end, another end thereof is second end, and said first end of said cover body is lower than said second end thereof, causing a top surface of said cover body to be formed into an inclined surface;
    wherein the length of each said cover body is smaller than the one of a bottom of said groove, causing said second end of said cover body to be inclined;
    wherein a plate body is configured between each two said adjacent cover bodies; and
    wherein said plate body is an inclined surface, and the inclined angle of said inclined surface is larger than the one of each said first end.

2. The storage according to claim 1, wherein an end surface of said container is a trapezoidal surface.

* * * * *